US007623936B1

(12) United States Patent
Qu et al.

(10) Patent No.: US 7,623,936 B1
(45) Date of Patent: Nov. 24, 2009

(54) DETERMINING SCHEDULING PRIORITY USING QUEUE TIME OPTIMIZATION

(75) Inventors: Peng Qu, Austin, TX (US); Vijay Devarajan, Arlington, TX (US); Michael A. Hillis, Austin, TX (US); Dax Middlebrooks, Kyle, TX (US); Farzad Sadjadi, Austin, TX (US); Chandrashekar Krishnaswamy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 271 days.

(21) Appl. No.: 11/356,267

(22) Filed: Feb. 16, 2006

(51) Int. Cl.
*G06F 19/00* (2006.01)
(52) U.S. Cl. .................................... 700/101; 700/121
(58) Field of Classification Search ............. 700/101, 700/121, 109, 127, 214, 182, 74
See application file for complete search history.

(56) References Cited

U.S. PATENT DOCUMENTS

| 6,418,351 | B1 * | 7/2002 | Martin ........................ 700/108 |
| 7,043,384 | B2 * | 5/2006 | Matsushita et al. ............ 702/81 |
| 2003/0130756 | A1 * | 7/2003 | Baweja et al. ................ 700/100 |
| 2003/0171829 | A1 * | 9/2003 | Fisher et al. ................... 700/28 |
| 2005/0115168 | A1 * | 6/2005 | Bealko ............................ 52/97 |
| 2005/0203655 | A1 * | 9/2005 | Tsai ............................ 700/101 |
| 2007/0073430 | A1 * | 3/2007 | Govind et al. ................. 700/99 |
| 2007/0124010 | A1 * | 5/2007 | Duffin et al. ................. 700/112 |

* cited by examiner

*Primary Examiner*—Kidest Bahta
(74) *Attorney, Agent, or Firm*—Williams, Morgan & Amerson, P.C.

(57) ABSTRACT

A method for determining priority of a selected workpiece in a process flow including a plurality of operations includes providing an objective function relating manufacturing losses to workpiece priority for the operations in the process flow. The objective function is solved to generate priority metrics for at least a subset of the operations remaining for the selected workpiece to allow completion of the selected workpiece in the process flow by a target completion due time.

22 Claims, 3 Drawing Sheets

DETERMINING SCHEDULING PRIORITY USING QUEUE TIME OPTIMIZATION

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

This invention pertains to automated manufacturing environments, such as semiconductor manufacturing, and, more particularly, to a method and apparatus for determining scheduling priority using queue time optimization.

Growing technological requirements and the worldwide acceptance of sophisticated electronic devices have created an unprecedented demand for large-scale, complex, integrated circuits. Competition in the semiconductor industry requires that products be designed, manufactured, and marketed in the most efficient manner possible. This requires improvements in fabrication technology to keep pace with the rapid improvements in the electronics industry. Meeting these demands spawns many technological advances in materials and processing equipment and significantly increases the number of integrated circuit designs. These improvements also require effective utilization of computing resources and other highly sophisticated equipment to aid, not only design and fabrication, but also the scheduling, control, and automation of the manufacturing process.

Turning first to fabrication, integrated circuits, or microchips, are manufactured from modern semiconductor devices containing numerous structures or features, typically the size of a few micrometers or less. The features are placed in localized areas of a semiconducting substrate, and are either conductive, non-conductive, or semi-conductive (i.e., rendered conductive in defined areas with dopants). The fabrication process generally involves processing a number of wafers through a series of fabrication tools. Each fabrication tool performs one or more of four basic operations discussed more fully below. The four basic operations are performed in accordance with an overall process to finally produce the finished semiconductor devices.

Integrated circuits are manufactured from wafers of a semiconducting substrate material. Layers of materials are added, removed, and/or treated during fabrication to create the integrated, electrical circuits that make up the device. The fabrication essentially comprises the following four basic operations:

- layering, or adding thin layers of various materials to a wafer from which a semiconductor is produced;
- patterning, or removing selected portions of added layers;
- doping, or placing specific amounts of dopants in selected portions of the wafer through openings in the added layers; and
- heat treating, or heating and cooling the materials to produce desired effects in the processed wafer.

Although there are only four basic operations, they can be combined in hundreds of different ways, depending upon the particular fabrication process.

Efficient management of a facility for manufacturing products, such as semiconductor chips, requires monitoring of various aspects of the manufacturing process. For example, it is typically desirable to track the amount of raw materials on hand, the status of work-in-process and the status and availability of tools and tools at every step in the process. One of the most important decisions in controlling the manufacturing process is selecting which lot should run on each process tool at any given time. Additionally, most tools used in the manufacturing process require scheduling of routine preventative maintenance (PM) procedures and equipment qualification (Qual) procedures, as well as other diagnostic and reconditioning procedures that must be performed on a regular basis, such that the performance of the procedures does not impede the manufacturing process itself.

One approach to this issue implements an automated "Manufacturing Execution System" (MES). An automated MES enables a user to view and manipulate, to a limited extent, the status of tools, or "entities," in a manufacturing environment. In addition, an MES enables the dispatching and tracking of lots or work-in-process through the manufacturing process to enable resources to be managed in the most efficient manner. Specifically, in response to MES prompts, a user inputs requested information regarding work-in-process and entity status. For example, when a user performs a PM on a particular entity, the operator logs the performance of the PM (an "event") into an MES screen to update the information stored in the database with respect to the status of that entity. Alternatively, if an entity is to be taken down for repair or maintenance, the operator logs this information into the MES database, which then prevents use of the entity until it is subsequently logged back up to a production ready state.

Although MES systems are sufficient for tracking lots and tools, such systems suffer several deficiencies. Current MES systems largely depend on manufacturing personnel for monitoring factory state and initiating activities at the correct time. One technique for actively affecting the flow of lots through the fabrication process is to assign each lot a priority, which represents the importance assigned to completing the particular lot with respect to all other lots being fabricated. Generally, if multiple lots having different priorities seek to be processed by a particular entity, the lot with the higher priority is scheduled to be processed first. Typically, a particular lot may be expedited by manually increasing its priority, for example, to the highest priority.

Changes to lot priority can affect the production flow, especially the on-time delivery of other lots. Typically, after the priority of a lot is changed, it remains at the new level for the remainder of its fabrication. Hence, changing a particular lot to have the highest priority may result in the lot being completed much earlier than is actually required.

Changing lot priority is identified as a major disruption in the semiconductor Industry. Lots of the highest priority have the following characteristics: they are allowed to reserve downstream tools; they may be manually carried for both inter- and intra-bay transportation; they may have to be batched alone for lots of new technology, or they can be batched alone without waiting for other incoming lots; they may be allowed to break setup (i.e., change the recipe of a particular entity); and they may be allowed to break cascading (i.e., change recipe in a multi-chamber tool causing chamber idle time).

Although the number of lots of highest priority is typically very limited in the fabrication facility, they bring significant impacts to the production flow. For bottleneck tools (e.g. a photolithography stepper), the capacity loss of tool reservations by priority lots is not recoverable. Hence, the reserving of bottleneck tools directly reduces throughput. For batching operations, tool reservations or single lot batches appreciably increases the average cycle time of production lots, as they may have to wait an extended time period (e.g., 12 hours) to get the tool. Such reservations also reduce tool utilization (e.g., a furnace is typically capable of processing six lots simultaneously, but only one priority lot in the same amount of time if a reservation is made). For steppers, priority lots also reserve reticles when reserving the tool, which expands the effect to other tools that may have to unload the reticle sets and experience unnecessary setups. As priority lots break cascading, it reduces the throughput of the overall manufacturing facility as well as increases the fluctuation of production flow.

Hence, changing lot priority is challenging because the effects of changing lot priorities are felt across the whole production environment and have an extended time horizon. In other words, the effects are not instantaneous and can last as long as a few months. Also, the effects of lot priority changes present different issues for different types of tools. Determining lot priorities requires both a global view of the fabrication facility and local views at the tool level to consider their correlation. Further, lot priority should be determined with the consideration of other priority lots and their status.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method for determining priority of a selected workpiece in a process flow including a plurality of operations. The method includes providing an objective function relating manufacturing losses to workpiece priority for the operations in the process flow. The objective function is solved to generate priority metrics for at least a subset of the operations remaining for the selected workpiece to allow completion of the selected workpiece in the process flow by a target completion due time.

Another aspect of the present invention is seen in a system including a plurality of tools for processing workpieces in a process flow including a plurality of operations and a priority management unit. The priority management unit is operable to employ a fabrication model of the process flow to employ an objective function relating manufacturing losses to workpiece priority for the operations in the process flow and solve the objective function to generate priority metrics for at least a subset of the operations remaining for the selected workpiece to allow completion of the selected workpiece in the process flow by a target completion due time.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
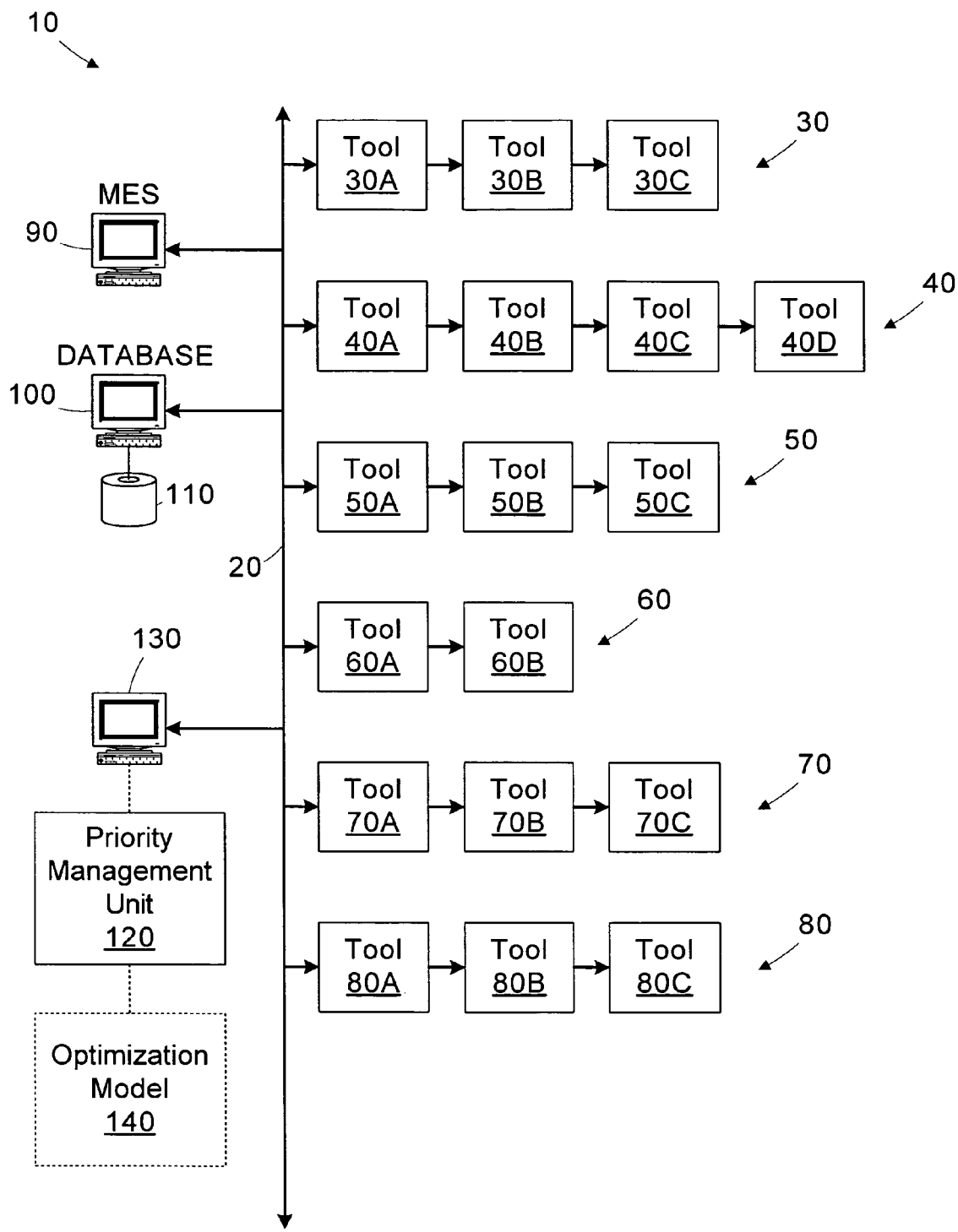
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the present invention shall be described in the context of an illustrative manufacturing system 10. The manufacturing system 10 includes a network 20, a plurality of tools 30-80, a manufacturing execution system (MES) server 90, a database server 100 and its associated data store 110, and a priority management unit 120 executing on a workstation 130.

In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The network 20 interconnects various components of the manufacturing system 10, allowing them to exchange information. Each of the tools 30-80 may be coupled to a computer (not shown) for interfacing with the network 20. The tools 30-80 are grouped into sets of like tools, as denoted by lettered suffixes. For example, the set of tools 30A-30C represent tools of a certain type, such as a chemical mechanical planarization (CMP) tool.

A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

The manufacturing execution system (MES) server 90 directs the high level operation of the manufacturing system 10. The MES server 90 monitors the status of the various entities in the manufacturing system 10 (i.e., lots, tools 30-80) and controls the flow of articles of manufacture (e.g., lots of semiconductor wafers) through the process flow. The database server 100 stores data related to the status of the various entities and articles of manufacture in the process flow using one or more data stores 110. The data may include pre-process and post-process metrology data, tool states, lot priorities, etc.

The MES server 90 stores information in the data store 110 related to the particular tools 30-80 (i.e., or sensors (not shown) associated with the tools 30-80) used to process each lot of wafers. As metrology data is collected related to the lot, the metrology data and a tool identifier indicating the identity of the metrology tool recording the measurements is also stored in the data store 110. The metrology data may include feature measurements, process layer thicknesses, electrical performance, surface profiles, etc. Data stored for the tools 30-80 may include chamber pressure, chamber temperature, anneal time, implant dose, implant energy, plasma energy, processing time, etc. Data associated with the operating recipe settings used by the tool 30-80 during the fabrication process may also be stored in the data store 110. For example, it may not be possible to measure direct values for some process parameters. These settings may be determined from the operating recipe in lieu of actual process data from the tool 30-80.

The distribution of the processing and data storage functions amongst the different computers 90, 100, 130 is generally conducted to provide independence and a central information store. Of course, different numbers of computers and different arrangements may be used. Moreover, the functions of some units may be combined. For example, the MES server 90 and the priority management unit 120 may be combined into a single unit.

As will be described in greater detail below, the priority management unit 120 determines priority changes for one or more remaining operations for a selected lot to attempt to decrease its completion time corresponding to a change in the target completion due time for the lot. Generally, the priority management unit 120 determines lot priorities while trying to minimize the impacts of the priority changes, such as throughput loss and manual handling loss. The priority management unit considers the current levels of work-in-process (WIP) and the priorities of other lots at particular operations. Rather than having a fixed priority for all operations, the priority of a given lot may be determined independently for each remaining operation in its fabrication process by determining the queue time at each operation separately.

The priority management unit 120 employs a non-linear optimization model 140 that receives as inputs the production flow and the throughput impacts at operation level, which may vary depending on the particular fabrication facility. Typically, throughput impacts may be determined using historical data or simulation experiments. The output of the optimization model 140 is the estimated queue time of a selected lot at each remaining operation. The priority management unit 120 may be invoked after a modification to a target due time for a selected lot.

The following notations are used in the ensuing example.
O Set of operations
$Q_o^{Avg}$ Average queue time at operation o∈O
$Q_o$ Actual queue time at operation o∈O
$I_o^{THP}$ Throughput impacts at operation o∈O
$I_o^{TRN}$ Priority turnover probability at operation o∈O
α Weight factor $0 \leq \alpha \leq 1$
$D_T$ Target completion due time
$D_C$ Completion time at current priority level
λ Minimum possible percentage of queue time In a semiconductor manufacturing environment, queue time (i.e., the time spent by a lot waiting to be processed at a given operation) is a common measure of priority. Relative priority may be estimated by determining the ratio between the queue time of the selected lot to the average queue time for the operation, which may be determined based on historical data. Hence, a priority, $P_o$, for a lot for a given operation may be represented as:

$$P_o = \frac{Q_o}{Q_o^{Avg}}, \quad (1)$$

where $Q_o$ is the actual queue time of a lot at an operation selected from a set of O operations, and $Q_o^{Avg}$ is the average queue time at the operation. For example, a high priority lot might have a queue time ratio of 0.5 (i.e., completed in one half the time required to complete the average lot), while the highest priority lot may have a priority of 0.1 (i.e., completed in one tenth the time required to complete the average lot).

The objective function of the optimization model 140 is:

$$OF = \alpha \sum_{o \in O} I_o^{THP} + (1-\alpha) \left( \frac{\sum_{o \in O} I_o^{TRN}}{\|O\|} \right). \quad (2)$$

Generally, the optimization function considers the sum of the throughout impacts, $I_o^{THP}$, at each operation and the sum of the priority turnover impacts (due to manual handling), $I_o^{TRN}$, at each operation. Weight factor, α, is used to represent the relative importance of each sub-objective. The value of α is user-configurable and lies between 0 and 1. For example, if α=0.5, it indicates that both the throughput and priority turnover impacts are equally important to determining the priorities. As the throughput impact objective may be contradictive to the priority turnover impact objective, the use of the weight factor helps balance the decisions. A non-linear solving software application may be used to solve the optimization problem in view of various defined constraints, which are detailed below. Various commercial solvers may be used. An exemplary open source solver is OSL, which was previously a product of IBM, Inc.

The priority management unit 120 employs the objective function to minimize the total negative impacts of priority changes to the manufacturing facility 10. As mentioned above, the impacts include capacity loss and additional manual handling. Capacity loss is modeled as throughput impact, as represented by the first portion of the equation. The throughput impacts differ at different operations depending on the priority assigned to that operation. Manual handling impacts are modeled as the probability of priority turnover. A priority turnover occurs when the priority assigned to the current operation differs from the priority at a previous operation. Usually, a lot needs to be assigned a different cassette when its priority is changed. This requires an operator to manually move the lot to a wafer sorter and move the sorted wafers in a different cassette back to the machine. In other words, the manual handling impacts increase along with the priority turnovers. As queue time is used as a measure to reflect lot priorities, it is not known exactly whether or not a given priority is changed through the use of the optimization model 140. However, the queue time differences can be used as a representation of the probability of priority changes. This information is collected at operation level to reflect the possible impacts of manual handling, which is modeled in the second section in the objective function.

The first constraint applied to the optimization function is that the lot is to be finished prior to the target completion due time. Hence, a hard constraint is defined as:

$$\sum_{o \in O} (Q_o^{Avg} - Q_o) \geq D_C - D_T. \quad (3)$$

The difference between the estimated completion time, $D_C$, and target completion due time, $D_T$, is the time the priority management unit 120 attempts to recover through priority adjustment. The direct reflection of priority adjustment is that the queue time is shorter, which is shown as the queue time savings in the left-hand side of the constraint. The total savings should be greater than or equal to the amount that is needed to allow the lot to be finished before the deadline. However, it is possible that a lot may actually increase its queue time at a specific operation due to uncertainty events. Such additional delays have to be caught up at the remaining operations. The value of $D_C$ can be determined using various approaches. Typically, a lot will have a default plan whenever it is released for fabrication. The plan includes estimated start-in and start-out times at every operation as well as the estimated fabrication-out time. Alternatively, a fabrication simulation may be used to generate a more current result.

One result from Constraint 1 is that a lot may have zero queue time at a certain operation, however, this result is not realistic due to the possible delay from material handling, recipe loading, cassette loading, etc. A second constraint is used to guarantee that at least a minimum amount of delay is planned for the lot at every operation to accommodate these situations. The second constraint is defined as:

$$Q_o \geq \lambda Q_o^{Avg}, \quad (4)$$

where λ represents the minimum allowable percentage of queue time for an operation.

A third constraint calculates the throughput impacts at the operation level. The throughput impact is a function of the actual queue time. Generally, the throughput impact is general function of the actual and average queue times:

$$I_o^{THP} = f\left(\frac{Q_o}{Q_o^{Avg}}\right). \quad (5)$$

Figure 2:
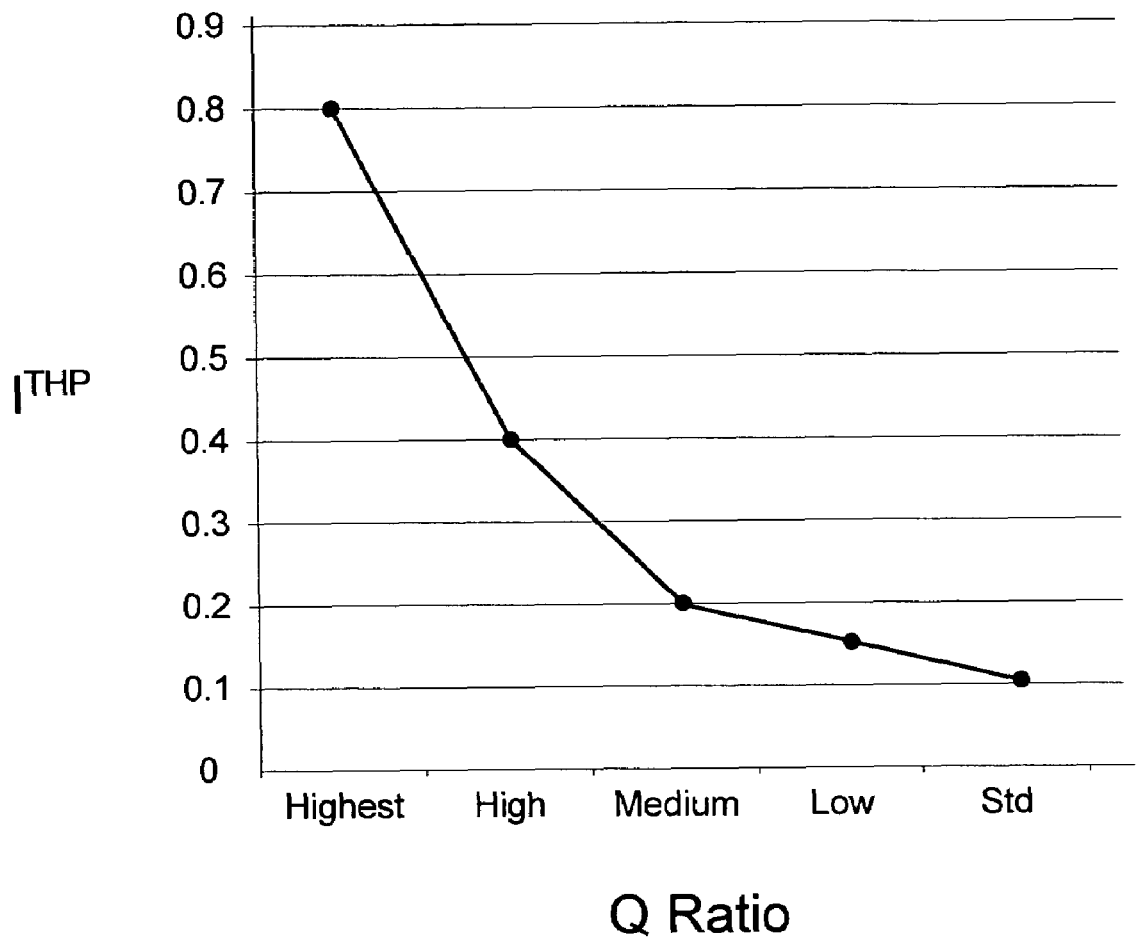
FIG. 2 is a diagram illustrating throughput impact as a function of priority.

Typically, the throughput function differs by fabrication facility and company. The throughput function can be derived using regression techniques from simulation impact analysis data. Generally, lots with the minimum $Q_o/Q_o^{Avg}$ ratio have the highest priority, and therefore have an increased impact on the manufacturing system 10. In one example, the $Q_o/Q_o^{Avg}$ ratio for the highest priority is 0.1 and 0.5 for high priority. In other words, lots of highest priority usually expects less than 10% delay compared to the average queue time. In this example, the throughput impact typically has the relationship with priority shown in FIG. 2. Assuming the priority is interpreted using the Q ratio, the throughput impact function may have the value:

$$y = -0.3 \, \text{Ln}(x) + 0.15, \quad (6)$$

where y is the throughput impact and x is the Q ratio. This function is specific to the fabrication facility, as it depends on the weekly start rate, product mix, and other production factors.

The probability of priority turnover is defined by the following constraint:

$$I_o^{TRN} = \left| \frac{Q_o}{Q_o^{Avg}} - \frac{Q_{o-1}}{Q_{o-1}^{Avg}} \right|. \quad (7)$$

Generally, a lot with the same priority at two different operations is expected to experience a similar percentage of queue delays. The bigger difference in the percentage of queue delays, the higher chance the lot is changed to a new priority that would require manual transport.

The priority management unit 120 solves the objective function of Equation 2 subject to the constraints defined by Equations 3-7. The solution to the objective function yields queue times for each of the remaining operations for the selected lot that will allow the lot to be finished by the new target completion due time, while minimizing the impacts on the manufacturing system in terms of throughput losses and manual handling losses, thereby reducing the disruption of the processing flow for other, non-priority lots. This technique increases the utilization and efficiency of the manufacturing system 10, thereby increasing throughput and profitability.

Figure 3:
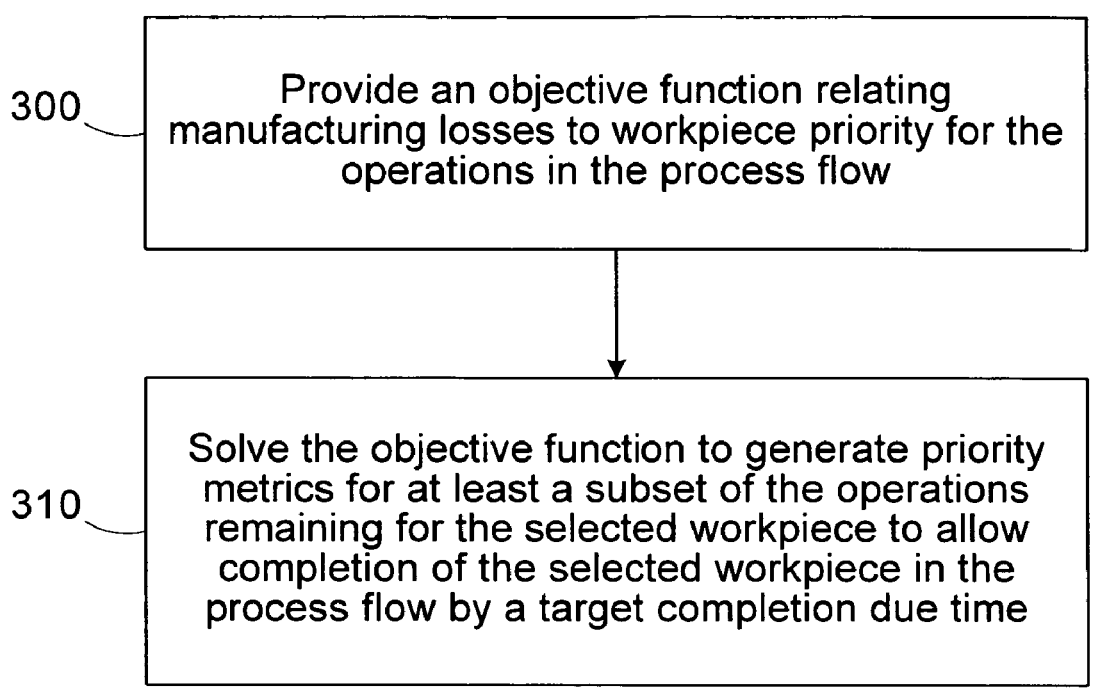
FIG. 3 is a simplified flow diagram of a method for determining scheduling priority using queue time optimization in accordance with another aspect of the present invention.

Referring now to FIG. 3 a simplified flow diagram of a method for determining priority of a selected workpiece in a process flow including a plurality of operations in accordance with another illustrative embodiment of the present invention is provided. In block 300, an objective function relating manufacturing losses to workpiece priority for the operations in the process flow is provided. In block 310, the objective function is solved to generate priority metrics for at least a subset of the operations remaining for the selected workpiece to allow completion of the selected workpiece in the process flow by a target completion due time.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A computer-implemented method for determining priority of a selected workpiece in a process flow including a plurality process tools for performing a plurality of operations for fabricating features of the selected workpiece, comprising:

defining an objective function in a computer relating manufacturing losses to workpiece priority for the operations in the process flow performed by the process tools;

solving the objective function in the computer to generate priority metrics for at least a subset of the operations remaining for the selected workpiece to allow completion of the selected workpiece in the process flow by a target completion due time, the subset including a current operation and at least one future operation; and processing the selected workpiece in at least one of the plurality of operations in the process flow in accordance with the priority metrics.

2. The method of claim 1, wherein the manufacturing losses include at least one of throughput losses and material handling losses.

3. The method of claim 1, wherein the workpiece priority and priority metrics are determined based on an actual queue time for the selected workpiece at a selected operation and an average queue time at the selected operation.

4. The method of claim 3, further comprising:
determining an estimated completion time;
establishing the target completion due time; and
solving the objective function subject to a first constraint relating the actual queue time and the average queue time at each operation to the estimated completion time and the target completion due time.

5. The method of claim 3, further comprising solving the objective function subject to a constraint establishing a minimum queue time at each operation.

6. The method of claim 3, wherein the manufacturing losses include at least throughput losses, further comprising solving the objective function subject to a constraint relating the throughput losses as a function of the actual queue time and the average queue time at each operation.

7. The method of claim 3, wherein the manufacturing losses include at least material handling losses, further comprising solving the objective function subject to a constraint relating the material handling losses as a function of the actual queue time and the average queue time at a first operation to the actual queue time and average queue time at a second, previous operation.

8. The method of claim 4, further comprising solving the objective function subject to:
a second constraint establishing a minimum queue time at each operation;
a third constraint relating the throughput losses as a function of the actual queue time and the average queue time at each operation; and
a fourth constraint relating the material handling losses as a function of the actual queue time and the average queue time at a first operation to the actual queue time and average queue time at a second, previous operation.

9. The method of claim 1, wherein at least two of the priority metrics are different.

10. The method of claim 1, further comprising processing additional workpieces in the process flow, including the selected workpiece.

11. A system, comprising:
a plurality of tools for processing workpieces in a process flow including a plurality of operations; and
a priority management unit operable to employ a fabrication model of the process flow to employ an objective function relating manufacturing losses to workpiece priority for the operations in the process flow and solve the objective function to generate priority metrics for at least a subset of the operations remaining for the selected workpiece to allow completion of the selected workpiece in the process flow by a target completion due time, the subset including a current operation and at least one future operation.

12. The system of claim 11, wherein the manufacturing losses include at least one of throughput losses and material handling losses.

13. The system of claim 11, wherein the priority management unit is operable to determine the workpiece priority and priority metrics based on an actual queue time for the selected workpiece at a selected operation and an average queue time at the selected operation.

14. The system of claim 13, wherein the priority management unit is operable to determine an estimated completion time, establish the target completion due time, and solve the objective function subject to a first constraint relating the actual queue time and the average queue time at each operation to the estimated completion time and the target completion due time.

15. The system of claim 13, wherein the priority management unit is operable to solve the objective function subject to a constraint establishing a minimum queue time at each operation.

16. The system of claim 13, wherein the manufacturing losses include at least throughput losses, and the priority management unit is operable to solve the objective function subject to a constraint relating the throughput losses as a function of the actual queue time and the average queue time at each operation.

17. The system of claim 13, wherein the manufacturing losses include at least material handling losses, and the priority management unit is operable to solve the objective function subject to a constraint relating the material handling losses as a function of the actual queue time and the average queue time at a first operation to the actual queue time and average queue time at a second, previous operation.

18. The system of claim 14, wherein the priority management unit is operable to solve the objective function subject to a second constraint establishing a minimum queue time at each operation, a third constraint relating the throughput losses as a function of the actual queue time and the average queue time at each operation, and a fourth constraint relating the material handling losses as a function of the actual queue time and the average queue time at a first operation to the actual queue time and average queue time at a second, previous operation.

19. The system of claim 11, wherein the tools are operable to process the selected workpiece in the process flow in accordance with the priority metrics.

20. The system of claim 11, wherein at least two of the priority metrics are different.

21. The system of claim 11, wherein the tools are operable to process additional workpieces in the process flow, including the selected workpiece.

22. A system for determining priority of a selected workpiece in a process flow including a plurality of operations in a computer, comprising:
- means for providing an objective function in the computer relating manufacturing losses to workpiece priority for the operations in the process flow;
- means for solving the objective function in the computer to generate priority metrics for at least a subset of the operations remaining for the selected workpiece to allow completion of the selected workpiece in the process flow by a target completion due time, the subset including a current operation and at least one future operation; and
- means for processing the selected workpiece in at least one of the plurality of operations in the process flow in accordance with the priority metrics.

* * * * *